(No Model.)
2 Sheets—Sheet 1.
J. W. BONTA.
AIR INJECTOR FOR FURNACES.
No. 287,754. Patented Oct. 30, 1883.
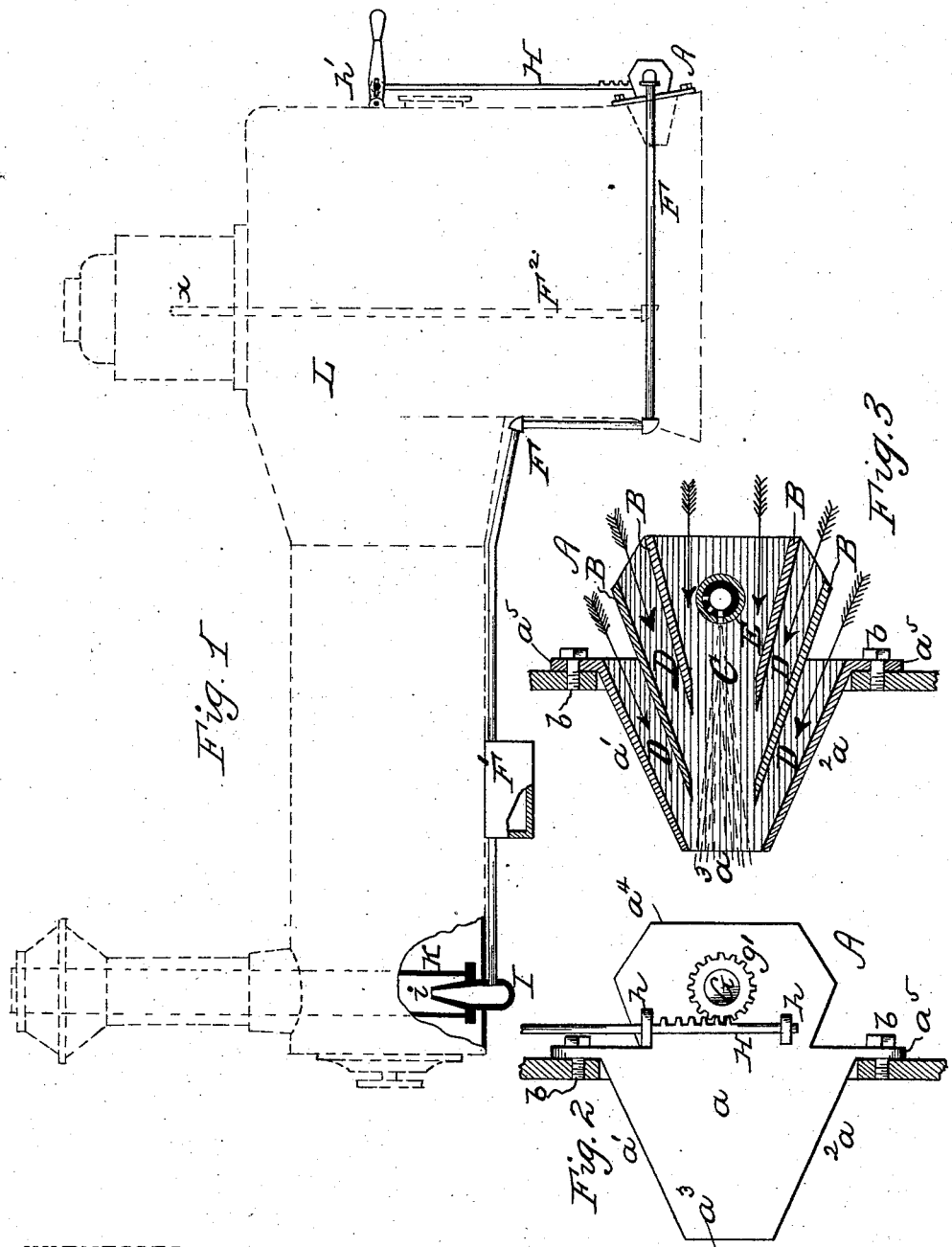
WITNESSES:
Henry F. Smith
Charles W. Williams
INVENTOR,
James W. Bonta
By S. J. Van Stavoren
ATTORNEY, (No Model.) 2 Sheets—Sheet 2.
J. W. BONTA.
AIR INJECTOR FOR FURNACES.
No. 287,754. Patented Oct. 30, 1883.
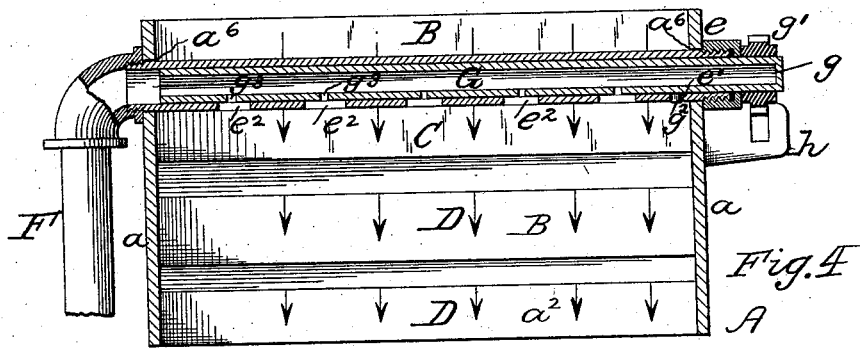
Fig. 4
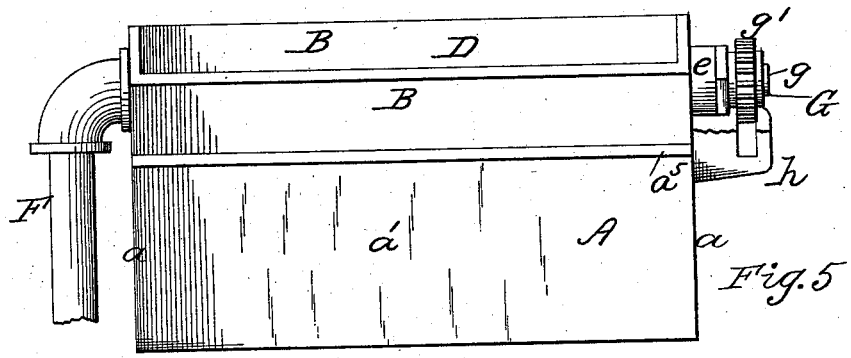
Fig. 5
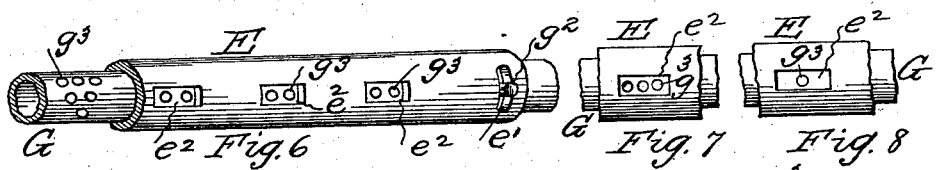
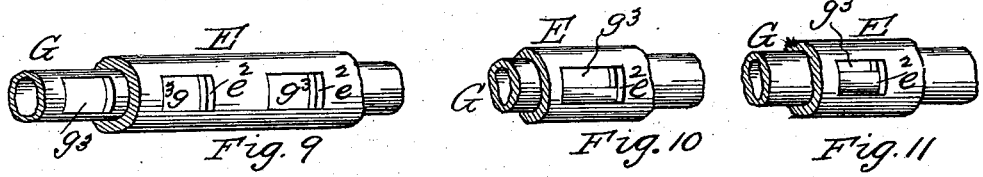
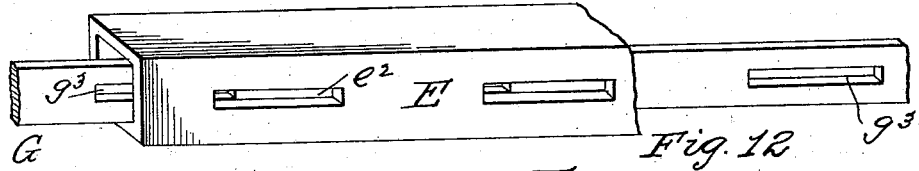
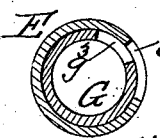
Fig. 13
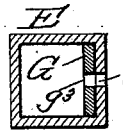
Fig. 14
WITNESSES:
H. F. Smith
C. W. Williams
INVENTOR
James W. Bonta
By S. J. Van Stavoren
ATTORNEY

UNITED STATES PATENT OFFICE.

JAMES W. BONTA, OF PHILADELPHIA, PA., ASSIGNOR TO THE GIANT AIR INJECTOR MANUFACTURING COMPANY, (LIMITED,) OF SAME PLACE.

AIR-INJECTOR FOR FURNACES.

SPECIFICATION forming part of Letters Patent No. 287,754, dated October 30, 1833.

Application filed July 30, 1883. (No model.)

*To all whom it may concern:*

Be it known that I, JAMES W. BONTA, a citizen of the United States, residing at Philadelphia, in the county of Philadelphia and State of Pennsylvania, have invented certain new and useful Improvements in Air-Injectors for Furnaces, of which the following is a specification, reference being had therein to the accompanying drawings, wherein—

Figure 1 is an elevation, partly sectional, of a locomotive-boiler furnace, smoke-stack, and exhaust port or nozzle illustrating my improvements applied thereto. Fig. 2 is a side elevation of the injector. Fig. 3 is a transverse vertical section. Fig. 4 is a longitudinal vertical section. Fig. 5 is a plan. Figs. 6, 7, and 8 are sectional details. Figs. 9, 10, and 11 are like views of modification of same. Fig. 12 is a perspective of another modification. Fig. 13 is a cross-section of Fig. 11, and Fig. 14 is a like view of Fig. 12.

My invention has relation to air-injecting devices for producing a continuous and even artificial draft for locomotive and other furnaces, and has for its object to provide a simple, cheap, and effective injector capable of injecting a maximum amount or volume of air by the use of a minimum quantity of steam, and to provide a multiple jet-tube and a simple and inexpensive cut-off for all the jets, whereby the force or extent of all the steam-jets may be simultaneously varied as desired.

My invention accordingly consists of the combination, construction, and arrangement of parts, as hereinafter described and claimed, having reference particularly to the following points: to the provision of an oblong injector having a central air-port, a series of air-inlets above and below the same and converging thereinto, as will hereinafter be described, a jet-tube located in the rear end of said central air-port, and arranged at right angles to the line of force of the steam-jets, a cut-off for said jet-tube, and mechanism for operating said cut-off, and to an injecting device having a multiple jet-tube, and a cut-off therefor, with operating mechanism for simultaneously varying the force or volume of the steam-jets or regulating the extent of feed of the injector, as will hereinafter be explained.

In the drawings, A represents the injecting appliance, which is oblong in outline, having ends $a\,a$, top and bottom $a'\,a^2$, and open sides $a^3\,a^4$, with intervening longitudinal partitions, B B, inclining toward the side $a^3$, so as to form a central air port or chamber, C, having above and below it one or more converging air inlets or ports, D D, as plainly shown in Fig. 3. The partitions are arranged in two series—an upper and a lower one. The inner ends of each plate in the respective series are on the same horizontal plane, so that the blast passes directly across the mouth of the ports, and thus prevent the formation of counter-currents, as would be the case if the plates were placed horizontally, or when the inner end of each successive plate of the upper series were placed on a higher and those of the lower series on a lower plane than the first plate. Upon the top and bottom $a'\,a^2$ are preferably formed the flanges or lugs $a^5$, through which pass screws $b\,b$ for securing the injector in position to a boiler-furnace, or other fixture.

E represents the jet-tube, located at the rear end of chamber or port C, and passes through openings $a^6$ in the ends $a\,a$. To one end of tube E is secured a pipe-connection, F, designed to lead to a boiler or other source of steam or motor supply. The opposite end of said tube E is furnished with a stuffing-box, $e$, through which passes a pipe or cut-off, G, having a closed end, $g$, and a gear-wheel, $g'$. The jet-tube E is thereby firmly held in position, and cannot rotate or move longitudinally. The cut-off G is prevented from moving in the direction of its length by means of a pin, $g^2$, secured thereto, which passes through and works in a slot, $e'$, formed in jet-tube E, as shown in Fig. 6, so that while said cut-off cannot move longitudinally it is free to rotate to a limited extent.

The jet-tube E is provided with a series of elongated slots or jet-openings, $e^2\,e^2$, as more plainly illustrated in Figs. 6 to 12, and the cut-off G is formed with perforations $g^3$ in line with or opposite to said jet-openings $e^2$. These perforations, as indicated in Fig. 6, are arranged in groups of one, two, and three, or more, so that by rotating the cut-off G a varying number of perforations, $g^3$, are caused to register with the jet-openings $e^2$, and thereby simultaneously increase or decrease the volume of steam supplied to openings $e^2$, and correspondingly vary the feed of the injector. Such described adjustment of the cut-off perforations $g^3$ is plainly shown in Figs. 6 to 8. Instead of using said perforations, an elongated slot may be substituted therefor, as shown in Figs. 9 to 11, the result in either case being the same. So, too, instead of using a cylindrical jet-tube and rotating cut-off tube, a square or oblong jet-tube and a longitudinally moving or sliding plate or cut-off may be employed, as shown in Figs. 12 and 14; or any other suitable form of jet-tube and cut-off may be substituted therefor.

To operate the cut-off I preferably use a rack-rod, H, which engages with the gear $g'$, slides in bearings $h\ h$, secured to or formed on the injector-shell, and is provided with a lever, $h'$, as shown in Fig. 1; or said gear $g'$ and rack-rod H may be dispensed with, and a lever attached directly to the cut-off may be substituted therefor; or any other suitable or desired form of operating mechanism for the cut-off may be employed.

The steam-supply pipe F of the injector may lead by a branch pipe, $F^2$, to the dome or other part of the boiler L, as shown at $x$, Fig. 1, so as to furnish live steam therefor; but I prefer to lead said pipe to the exhaust-ports I of the cylinders, connection being made therewith at a point below the contracted nozzle or terminus of said ports, so as to obtain the full pressure of said exhaust, which at said point is nearly equal to the working-pressure in the boiler. Such connection permits, therefore, of the utilization of part of the exhaust-steam for injecting air to the furnace, to produce an artificial draft therefor, thereby economizing in the use of live steam, and effecting a saving of fuel in addition to that resulting from the employment of the artificial draft or air-injecting appliances.

The surplus steam not passing to pipe F escapes through the nozzle $i$, as usual, and to prevent such exhaust pulsating the draft of the furnace, a pipe, K, is placed around said nozzle, and leads up to the top of the stack, for conducting the exhaust through the latter. To avoid a pulsation or intermission in the supply of exhaust-steam for the injector, a reservoir, F', is located in the line of pipe F, to take up a greater volume of such steam than will pass through the injector, thereby providing for a reserve supply for the latter during the intervals of cessation of escape of exhaust from the cylinders.

The operation is obvious. Steam being admitted to pipe F, and the cut-off G being adjusted as desired, steam passes through the jet-openings $e^2$ in pipe E to form a series of aligning jets, which pass through chamber C, produce a vacuum therein, and in the inlets or ports D D, which creates a rush of air to said ports to form a supply, which is fed by said steam-jets to the furnace or other fixture.

An injector so constructed has five or more air ports or inlets, and a series of steam-jets having a common supply. Consequently with a given volume or force of steam it will inject a greater volume of air than it would otherwise do if it had only one air inlet and jet.

While I have described my invention as being especially applicable as an air-injector, yet I do not wish to be understood as confining myself thereto, as it may be used for injecting shavings, sawdust, or other material either into a furnace or any other fixture.

What I claim is—

1. An air-injector composed of an oblong body or shell open at both ends, and adapted to be attached to the walls of the furnace, and having attached to its side walls a series of inclined plates in the upper and lower part, the inner end of each series being on substantially the same horizontal plane, and a jet-tube located longitudinally in said shell between the series of inclined plates, substantially as described.

2. The combination, with a box or body, A, open at both ends, and adapted to be attached to the walls of the furnace, and having attached to its side walls a series of inclined plates in the upper and lower part, the inner end of each series being on substantially the same horizontal plane, of a jet tube, E, passing through the side walls of the injector, and having openings $e^2$, cut-off G, provided with registering openings $g^3$, and operating mechanism for the latter, substantially as described.

3. The combination of an oblong body or shell open at both ends, and having a series of inclined plates in the upper and lower part, the inner end of each series being on substantially the same plane, and a jet-tube located in said chamber, and having a series of aligning jet-openings, and a cut-off for simultaneously opening and closing the jet-openings, substantially as described.

4. In combination with the injector A, the jet-tube E, having steam-connection at one end, a stuffing-box at its opposite end, and an internal cut-off tube with openings and closed outer end extending beyond the jet-tube, and having means attached thereto for regulating the cut-off, substantially as shown and described.

5. In combination with injector A, open at ends $a^3$ and $a^4$, and having inclined plates B, the inner ends of which are on substantially the same horizontal plane, the tube E, having openings $e^2$, and the cut-off G, having closed end $g$ and registering openings $g^3$, substantially as shown and described.

6. The injector A, provided with jet-tube E, having openings $e^2$ and slot $e'$, and a cut-off, G, having registering openings $g^3$, pin $g^2$, and closed end $g$, extending beyond the tube E, and provided with means for moving the same, substantially as shown and described.

In testimony whereof I affix my signature in presence of two witnesses.

JAMES W. BONTA.

Witnesses:
S. J. VAN STAVOREN,
CHAS. F. VAN HORN.